United States Patent
Cordery et al.

(10) Patent No.: US 7,424,975 B2
(45) Date of Patent: Sep. 16, 2008

(54) METHOD FOR PRINTING TWO DIMENSIONAL BARCODES TO REDUCE READING ERRORS

(75) Inventors: Robert A. Cordery, Danbury, CT (US); Frederick W. Ryan, Jr., Oxford, CT (US); Claude Zeller, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 228 days.

(21) Appl. No.: 11/511,790

(22) Filed: Aug. 29, 2006

(65) Prior Publication Data

US 2008/0054080 A1    Mar. 6, 2008

(51) Int. Cl.
*G06K 7/10* (2006.01)
(52) U.S. Cl. .............. 235/462.09; 235/462.01; 235/462.08; 235/494
(58) Field of Classification Search ........... 235/462.01, 235/462.08, 462.09, 462.1, 487, 494; 283/81
See application file for complete search history.

(56) References Cited

U.S. PATENT DOCUMENTS

| | | | |
|---|---|---|---|
| 5,726,435 A | 3/1998 | Hara et al. | |
| 6,631,012 B2 | 10/2003 | Athens et al. | |
| 6,814,291 B1 | 11/2004 | Cordery et al. | |
| 7,032,823 B2 * | 4/2006 | Nojiri | 235/462.09 |
| 7,264,174 B2 * | 9/2007 | Chang et al. | 234/494 |
| 7,281,660 B2 * | 10/2007 | Kim et al. | 235/462.09 |
| 2006/0151603 A1 | 7/2006 | Nisius | |
| 2006/0163354 A1 | 7/2006 | Tyranski et al. | |

OTHER PUBLICATIONS

Copy of postal indicium printed Jun. 1, 2001 by Fancotyp-Postalia.
Auslander, Judith et al., "The Influence of Ink and Paper on Bar Code Print Quality and Readability with OCR Scanning Systems," The Society for Imaging Science and Technology (IS&T) 21st International Conference on Digital Printing Technologies, Sept. 20, 2005.

* cited by examiner

*Primary Examiner*—Seung H Lee
(74) *Attorney, Agent, or Firm*—Brian A. Lemm; Angelo N. Chaclas (57) ABSTRACT

A method of printing modules for a two dimensional barcode that includes printing a pixel at a plurality of the pixel locations included in the inner portion of the darkened module, and printing a pixel at less than all of the pixel locations of the outer boundary of the darkened module. Various embodiments are contemplated, such as, without limitation, methods that print darkened modules having four light corners, three light corners, two light corners, one light corner, and/or one light edge. Also, a method of printing a two dimensional barcode having a finder pattern wherein the inner edge of the finder pattern is light, meaning that is does not include any printed pixels at the pixel locations along the inner edge.

18 Claims, 6 Drawing Sheets

METHOD FOR PRINTING TWO DIMENSIONAL BARCODES TO REDUCE READING ERRORS

FIELD OF THE INVENTION

The present invention relates to two dimensional barcodes, such as those used in postal indicia, and in particular to a method of printing two dimensional barcodes that overcomes problems encountered in reading such barcodes whose images have been processed by Optical Character Recognition (OCR) thresholding programs.

BACKGROUND OF THE INVENTION

The postal services of many countries around the world permit and/or require the printing of evidence of postage payment, such as a postal indicium, that includes a two dimensional barcode. Such indicia are commonly referred to as Digital Postage Marks (DPM). For example, the United States Postal Service has implemented a program known as the Information Based Indicia Program (IBIP) which permits a user to generate a postage indicium for sending a mailpiece (e.g., letter, package, etc.) that includes a human readable portion and a machine readable portion in the form of a two dimensional barcode, such as, without limitation, a Data Matrix symbol.

As is known, a two dimensional barcode, such as a Data Matrix symbol, typically consists of a number of data regions having nominally square modules arranged in an array, wherein each module generally represents one bit of data. For a black on white Data Matrix symbol, for instance, a darkened (i.e., filled) module represents a binary "one" and a light (e.g., empty) module represents a binary "zero." Each darkened module typically consists of multiple printed pixels (e.g., in the case of ink jet printing, multiple drops of ink). For example, a darkened module may consist of 25 pixels arranged in a 5×5 pixel pattern or 16 pixels arranged in a 4×4 pixel pattern. The data regions in a two dimensional barcode are usually surrounded by a finder pattern which, in turn, is surrounded by a quiet zone border. In addition, multiple data regions may be separated by an alignment pattern.

Figure 1:
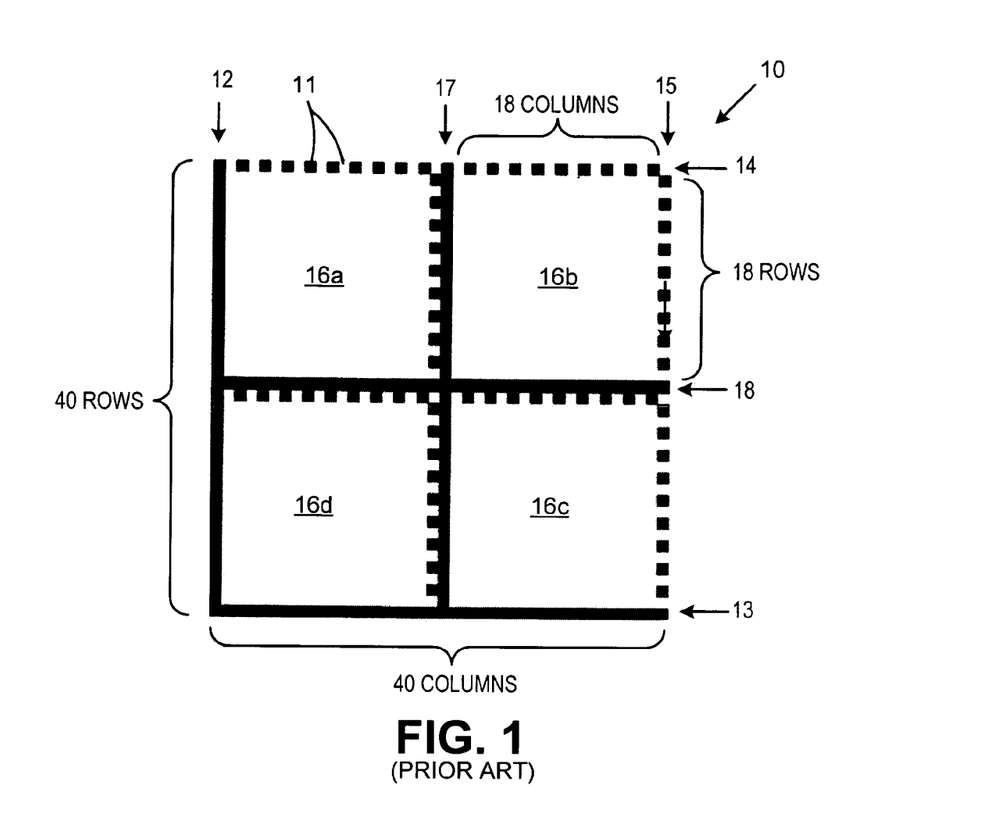
FIG. 1 is a schematic diagram of an exemplary prior art "empty" 40×40 Data Matrix symbol.
Figure 2:
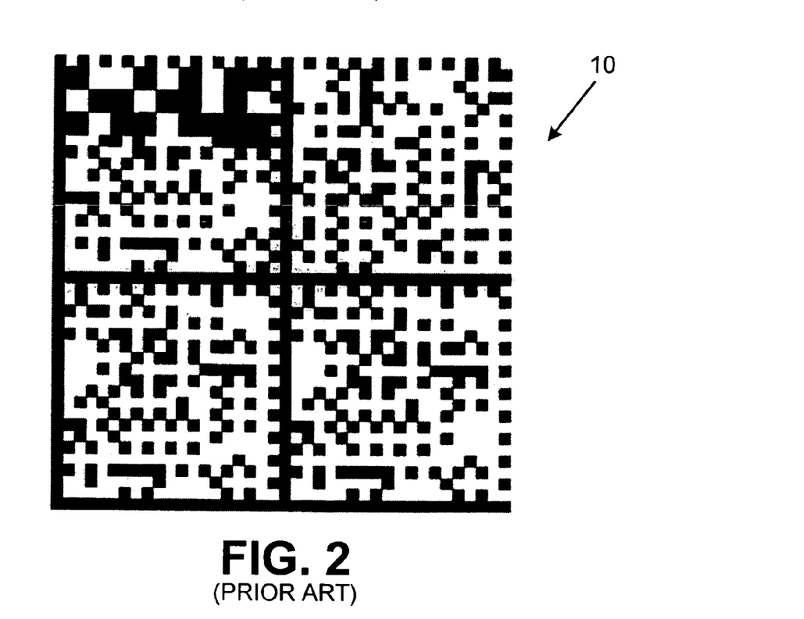
FIG. 2 is a schematic diagram of a Data Matrix symbol as shown in FIG. 1 that includes data.

FIG. 1 illustrates an exemplary "empty" 40×40 Data Matrix symbol 10. More specifically, the symbol 10 shown in FIG. 1 includes 40 rows and 40 columns of modules 11. The left-most column 12 and the bottom-most row 13 of the symbol 10 form an "L" shaped boundary, often referred to as the finder pattern, which is employed to locate the symbol 10, to determine the physical size and orientation of the symbol 10 and/or to determine whether the symbol 10 was distorted when printed. The top-most row 14 and right-most column 15 of the symbol 10 consist of alternating dark and light modules 11 which are employed to define the cell structure of the symbol 10 and/or to assist in determining the physical size and distortion of the symbol 10. As seen in FIG. 1, the symbol 10 is divided into four data regions 16a-16d by a vertical alignment bar 17 and a horizontal alignment bar 18, also sometimes referred to as an alignment pattern. As shown in FIG. 1, each data region 16a-16d is comprised of 18 rows and 18 columns of modules 11. FIG. 2 illustrates the Data Matrix symbol 10 of FIG. 1 with information encoded and stored within the four data regions 16a-16d. A detailed description of the Data Matrix symbology can be found in ISO/IEC International Standard 16022:2000(E) entitled "Information Technology—International Symbology Specification—Data Matrix".

The two dimensional barcode employed in many DPMs, such as the Data Matrix symbol in an IBIP indicium, typically includes encrypted or signed information, such as the postage amount and other postal data relating to the mailpiece and the postage meter that printed the indicium (usually referred to as a digital token or a digital signature), that may be used by the particular postal service in question to authenticate the indicia after the mailpieces have been entered into the mail stream. In particular, the postal service may use an optical scanning device to create a digital image of the DPM. A recognition routine, such as, for example, pattern matching, may then be employed to verify the authenticity of the DPM by decoding and interpreting the information contained within the DPM.

As is known, many posts already use optical scanning techniques to assist with the processing of mailpieces. In particular, many posts currently employ optical scanners running OCR thresholding algorithms to read address information from mailpieces wherein grayscale images taken from the mailpieces are converted to black and white images for further processing. The problem is that most of the OCR thresholding algorithms in use are optimized for use in reading addresses printed with a wide range of printers on a variety of envelopes and, for the reasons described below, are not well suited for also reading two dimensional barcodes.

The OCR thresholding algorithms used by many posts to read addressees are designed to simplify the further OCR processing by first separating background regions (paper only) from foreground regions (ink and paper). Typically, the background removal is performed using a windowing technique wherein a window is progressively moved along and about the image and in each spot the portion of the image covered by the window is tested against two tests. In the first test, it is determined whether the portion within the window is too dark to be allowed as paper. In the second test, it is determined whether the variation of reflectivity within the window is large enough for it to be considered to contain useful OCR information. If the portion within the window passes either of these two tests, then that portion is considered to be a candidate for OCR processing, and the image is converted from grayscale to black and white using a thresholding technique (i.e., pixels below a threshold level are considered black and pixels above a threshold level are considered white). However, if a portion within the window fails both tests, then it is not considered to be an OCR candidate and is treated as background, meaning all of the pixels are converted to white.

This processing presents a problem when the image being read is a two dimensional barcode. Specifically, if the barcode includes a region where several neighboring modules are darkened, it is possible that the window, which may be about the size of a 2×2 module array, will land on an area that is completely printed (i.e., no "white" pixels). As will be appreciated, that portion will fail the second test described above because there will not be sufficient variation in reflectivity. Normally, one would think that the covered portion would pass the first test because of the "darkness" of the portion. However, many inks that are used to print two dimensional barcodes in postal indicia do not have sufficient ink optical density to pass the first test (e.g., blue or red inks are required by some posts). The ranges of parameters employed in thresholding addresses are selected to perform well on dark envelopes used by some mailers. In some cases, dark envelopes have a lower reflectivity that the required ink printed on other higher reflectivity envelopes. As a result, the covered portion, although it is a portion consisting entirely of darkened modules and therefore entirely of printed pixels, will fail both tests and be considered to be background and all of the pixels will be converted to white by the thresholding process. As will be appreciated, this will result in the loss of data as modules that should be binary "ones" (filled) will be converted to binary "zeroes" (empty). In the case of the finder patterns described above, this will result in damage to the finder patterns and thus possible difficulty in locating the barcodes when they are to be decoded. Thus, there is a need for a method of printing two dimensional barcodes that avoids the problems caused by current OCR thresholding algorithms as described above.

SUMMARY OF THE INVENTION

In one embodiment, the invention relates to a method of printing modules for a two dimensional barcode that includes a plurality of darkened modules and a plurality of non-darkened modules that helps to overcome the problems associated with OCR thresholding systems that read two dimensional barcodes. The darkened modules each include a substantially rectangular array of pixel locations including: (i) an outer boundary of the array including a top row of the pixel locations, a bottom row of the pixel locations, a left most column of the pixel locations, and a right most column of the pixel locations, and (ii) an inner portion of the array including the pixel locations not included within the outer boundary. The method includes printing one or more of the darkened modules by printing a pixel at a plurality of, and preferably all of, the pixel locations included in the inner portion of the array of each of the one or more of the darkened modules, printing a pixel at at least one of the pixel locations of the bottom row of the pixel locations or the left most column of the pixel locations of the outer boundary of the array of each of the one or more darkened modules, and printing a pixel at less than all of the pixel locations of the top row of the pixel locations and the right most column of the pixel locations of the outer boundary of the array of each of the one or more of the darkened modules. Various embodiments are contemplated, such as, without limitation, methods that print darkened modules having four light corners, three light corners, two light corners, one light corner, and/or one light edge, among others.

According to a further aspect of the invention, a method is provided for printing a two dimensional barcode having a finder pattern consisting of a number of darkened modules that also helps to overcome the problems associated with OCR thresholding systems that read two dimensional barcodes. In this embodiment, the inner edge of the finder pattern is light, meaning that is does not include any printed pixels at the pixel locations along the inner edge.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

The present invention relates to a method of printing a two dimensional barcode that reduces the likelihood of errors occurring when the barcode is read by a scanner using OCR thresholding techniques described elsewhere herein. According to an embodiment of the invention, when a two dimensional barcode is printed, the printing of some or all of the darkened or filled modules of the barcode is modified or altered. In particular, in an embodiment of the invention, some of the pixels along the edges of the darkened or filled modules are removed (not printed) so that when the window used in the OCR thresholding lands on a portion of the barcode that includes the modified darkened module, there will always be at least some light space within the window. As a result, the variation within the window will be such that the portion within the window will pass the second OCR thresholding test described above and the portion will be considered to be an OCR candidate and will be treated as foreground. Thus, if the window lands on an area of the two dimensional barcode where several neighboring modules are darkened (as modified), that region will, due to the reflectivity introduced by the removed or non-printed pixels, pass the second OCR test even though the same region may fail the first OCR test. As a result, the region will be treated as a candidate for OCR processing, and not treated as background.

Figure 3:
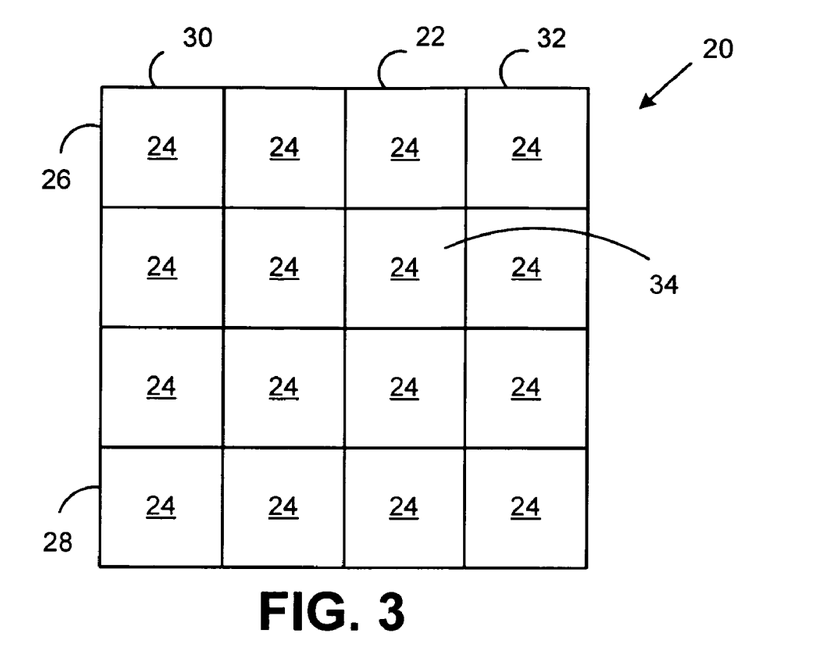
FIG. 3 is a schematic diagram of template for a module for a two dimensional barcode for use in the present invention.

FIG. 3 is a schematic diagram of an embodiment of a template for a module 20 that may be printed as described above as part of a two dimensional barcode. The module 20 includes a substantially rectangular array 22 of pixel locations 24. As seen in FIG. 3, the array 22 includes a top row 26 of the pixel locations 24, a bottom row 28 of the pixel locations 24, a left most column 30 of the pixel locations 24, and a right most column 32 of the pixel locations 24 which together form a substantially rectangular outer boundary of the array 22. The array 22 also includes an inner portion 34 consisting of the pixel locations 24 not included within the top row 26, the bottom row 28, the left most column 30, and a right most column 32. In one embodiment, the method of the present invention provides for the printing of a two dimensional barcode that includes one or more modules 20 that are printed by printing a pixel at a plurality of, and preferably all of, the pixel locations 24 included in the inner portion 34 of the array 22, printing a pixel at at least one of the pixel locations of the bottom row of the pixel locations or the left most column of the pixel locations of the outer boundary of the array of each of the one or more darkened modules, and printing a pixel at less than all of the pixel locations of the top row of the pixel locations and the right most column of the pixel locations of the outer boundary of the array 22. As a result, the modules 20 printed in such a manner will, due to the light variation introduced by the pixels that are not printed in the outer boundary, cause a window that includes the module 20 to pass the second OCR test. In addition, because the algorithms used to decode two dimensional barcodes, such as Data Matrix symbols, find the centers of the modules included therein, the "light" areas of the outer boundary of the array 22 will not interfere with the decoding process.

Figure 4:
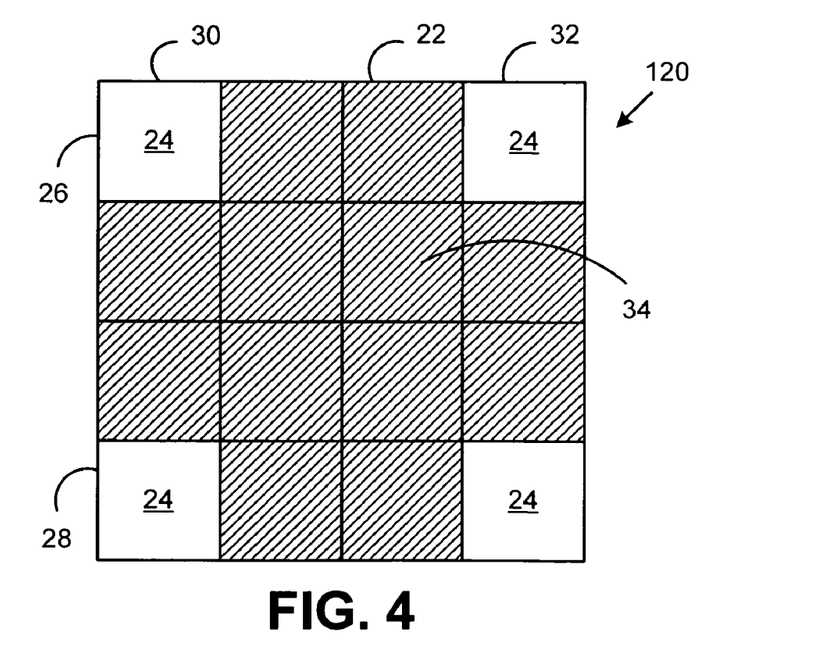
FIGS. 4 through 9 are schematic diagrams of various embodiments of a module for use in a two dimensional barcode printed according to the method of the present invention.

FIG. 4 is schematic diagram of a first embodiment of a module 120 printed by the method described above. As seen in FIG. 4, the module 120 in this embodiment includes a pixel printed with a suitable ink at all of the pixel locations 24 included in the inner portion 34 of the array 22 and a pixel printed with a suitable ink at (i) all of the pixel locations 24 of the top row 26 other than a first pixel location 24 and a last pixel location 24 in the top row 26, (ii) all of the pixel locations 24 of the right most column 32 other than a top pixel location 24 and a bottom pixel location 24 in the right most column 32, (iii) all of the pixel locations 24 of the bottom row 28 other than a first pixel location 24 and a last pixel location 24 in the bottom row 28, and (iv) all of the pixel locations 24 of the left most column 30 other than a top pixel location 24 and a bottom pixel location 24 in the left most column 30. In other words, all of the pixel locations 24 in the module 120 in this first embodiment other than the outer four corners are printed.

Figure 5:
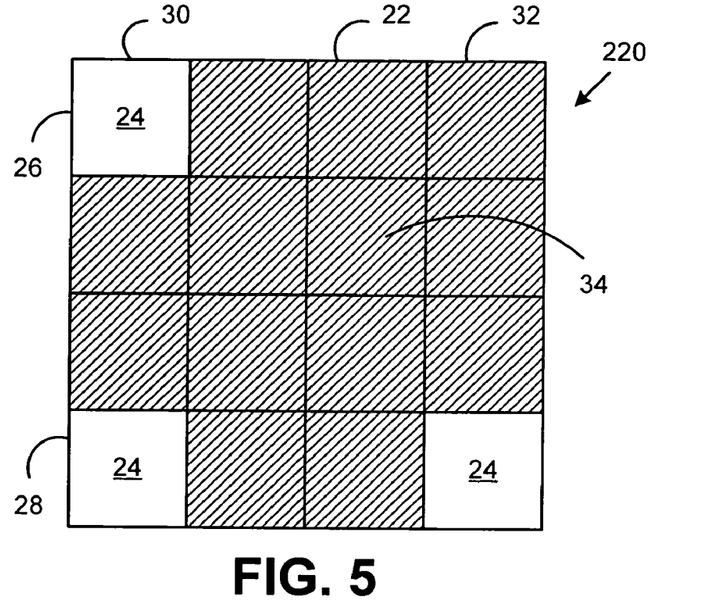

FIG. 5 is a schematic diagram of a second embodiment of a module 220 printed by the method described above. As seen in FIG. 5, the module 220 in this embodiment includes a pixel printed with a suitable ink at all of the pixel locations 24 included in the inner portion 34 of the array 22 and a pixel printed with a suitable ink at (i) all of the pixel locations 24 of the top row 26 other than a first pixel location 24, (ii) all of the pixel locations 24 of the right most column 32 other than a bottom pixel location 24 in the right most column 32, (iii) all of the pixel locations 24 of the bottom row 28 other than a first pixel location 24 and a last pixel location 24 in the bottom row 28, and (iv) all of the pixel locations of the left most column 30 other than a top pixel location 24 and a bottom pixel location 24 in the left most column 30. In other words, all of the pixel locations 24 in the module 220 in this second embodiment other than three of the outer four corners are printed. As will be appreciated, the particular three corners that are not printed may be varied in this second embodiment.

Figure 6:
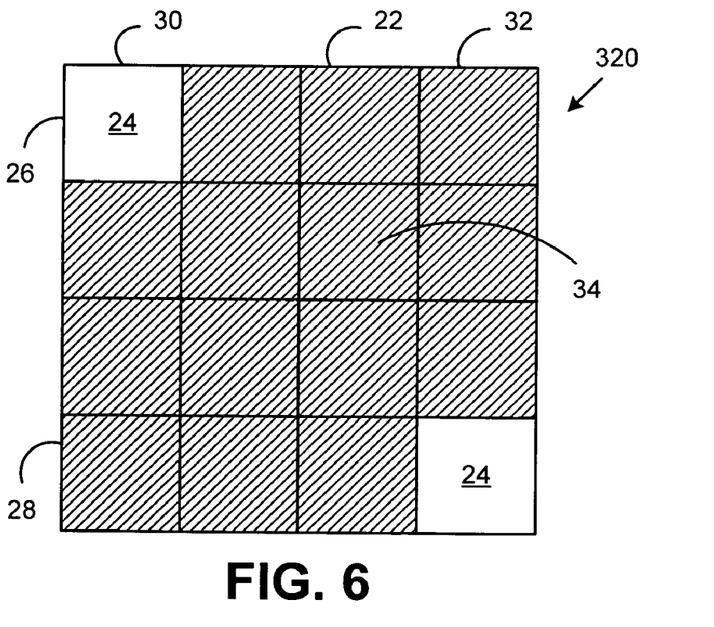

FIG. 6 is a schematic diagram of a third embodiment of a module 320 printed by the method described above. As seen in FIG. 6, the module 320 in this embodiment includes a pixel printed with a suitable ink at all of the pixel locations 24 included in the inner portion 34 of the array 22 and a pixel printed with a suitable ink at (i) all of the pixel locations 24 of the top row 26 other than a first pixel location 24, (ii) all of the pixel locations 24 of the right most column 32 other than a bottom pixel location 24 in the right most column 32, (iii) all of the pixel locations 24 of the bottom row 28 other than a last pixel location 24 in the bottom row 28, and (iv) all of the pixel locations of the left most column 30 other than a top pixel location 24 in the left most column 30. In other words, all of the pixel locations 24 in the module 320 in this second embodiment other than two of the outer four corners are printed. As will be appreciated, the particular two corners that are not printed may be varied in this third embodiment.

Figure 7:
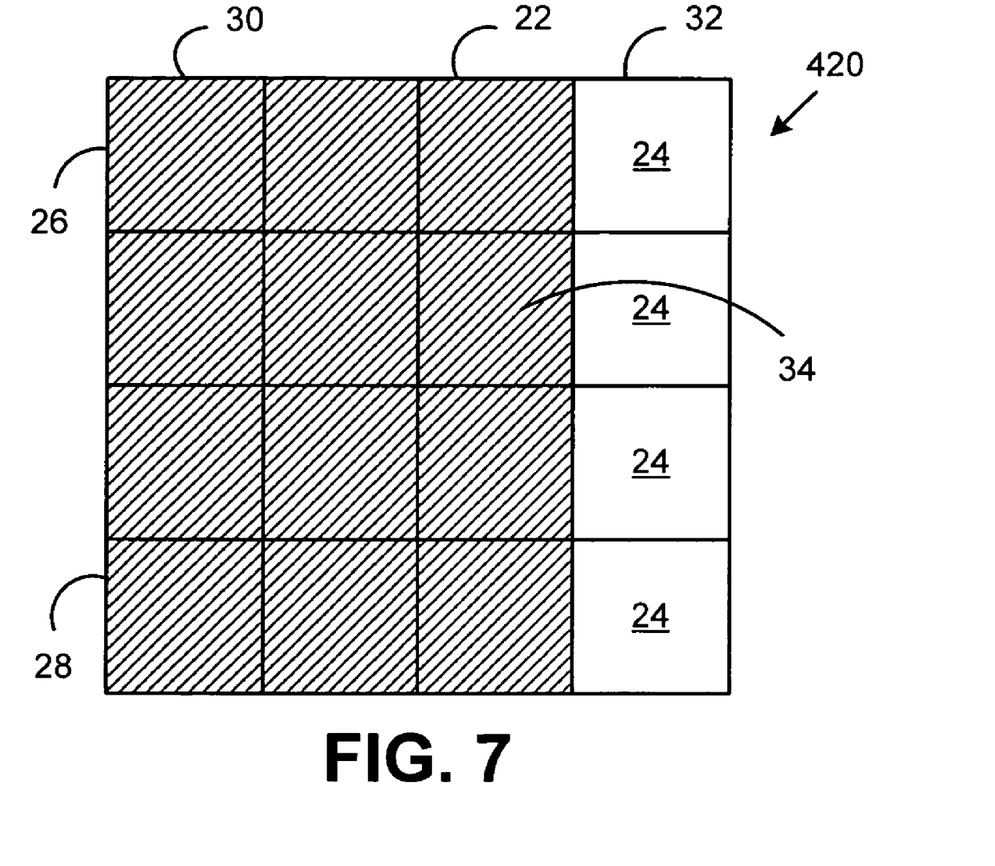

FIG. 7 is a schematic diagram of a fourth embodiment of a module 420 printed by the method described above. As seen in FIG. 7, the module 420 in this embodiment includes a pixel printed with a suitable ink at all of the pixel locations 24 included in the inner portion 34 of the array 22 and a pixel printed with a suitable ink at (i) all of the pixel locations 24 of the top row 26 other than a last pixel location 24, (ii) all of the pixel locations 24 of the bottom row 28 other than a last pixel location 24 in the bottom row 28, and (iii) all of the pixel locations 24 of the left most column 30. As also seen in FIG. 7, no pixels are printed in the pixel locations 24 of the right most column 32. In other words, all of the pixel locations 24 in the module 420 in this fourth embodiment other than the right edge of the outer boundary of the module 420 are printed.

Figure 8:
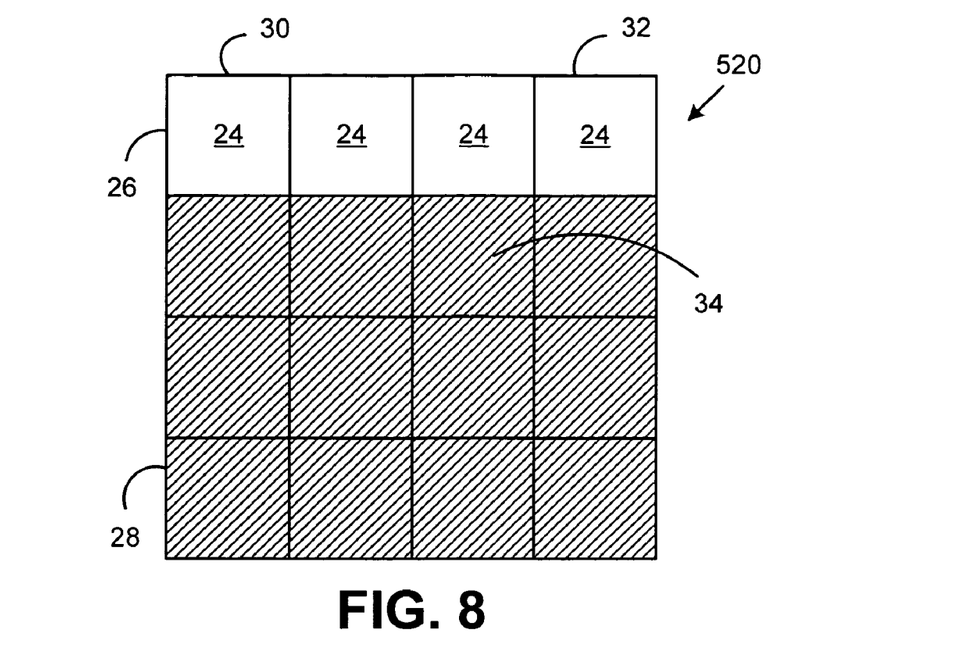

FIG. 8 is a schematic diagram of a fifth embodiment of a module 520 printed by the method described above. As seen in FIG. 8, the module 520 in this embodiment includes a pixel printed with a suitable ink at all of the pixel locations 24 included in the inner portion 34 of the array 22 and a pixel printed with a suitable ink at (i) all of the pixel locations 24 of the bottom row 28, (ii) all of the pixel locations 24 of the left most column 30 other than a top pixel location 24 in the left most column 30, and (iii) all of the pixel locations 24 of the right most column 32 other than a top pixel location 24 in the right most column 32. As also seen in FIG. 8, no pixels are printed in the pixel locations 24 of the top row 26. In other words, all of the pixel locations 24 in the module 520 in this fifth embodiment other than the top edge of the outer boundary of the module 520 are printed.

Figure 9:
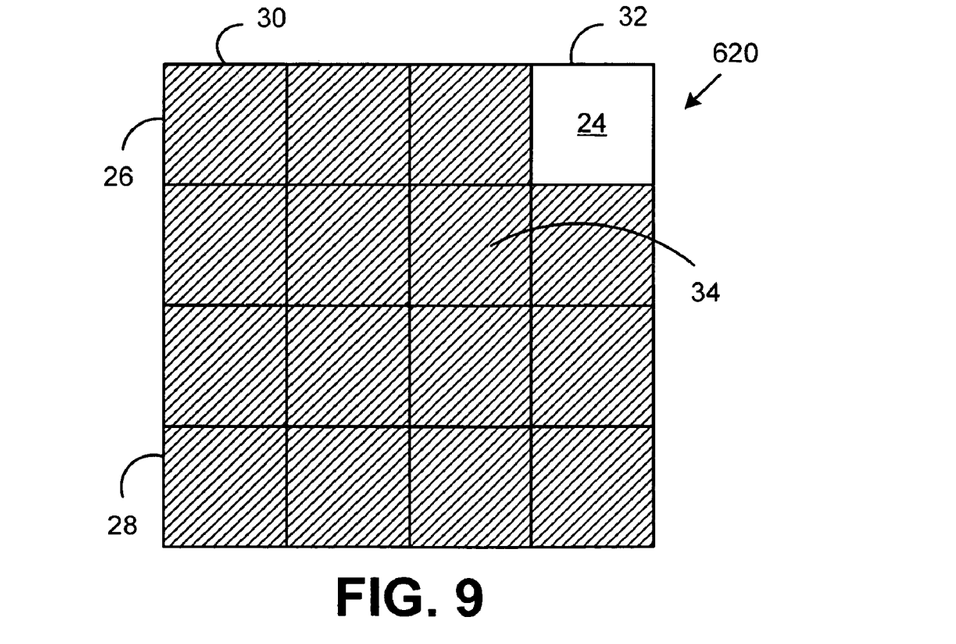

FIG. 9 is a schematic diagram of a sixth embodiment of a module 620 printed by the method described above. As seen in FIG. 9, the module 620 in this embodiment includes a pixel printed with a suitable ink at all of the pixel locations 24 included in the inner portion 34 of the array 22 and a pixel printed with a suitable ink at (i) all of the pixel locations 24 of the top row 26 other than a last pixel location 24, (ii) all of the pixel locations 24 of the right most column 32 other than a top pixel location 24 in the right most column 32, (iii) all of the pixel locations 24 of the bottom row 28, and (iv) all of the pixel locations of the left most column 30. In other words, all of the pixel locations 24 in the module 620 in this sixth embodiment other than one of the outer four corners are printed. As will be appreciated, the particular corner that is not printed may be varied in this seventh embodiment.

As discussed elsewhere herein, many two dimensional barcodes include a L-shaped finder pattern (see FIGS. 1 and 2 and associated discussion) that is used in recognizing the barcode. Because prior art finder patterns consist of all darkened modules, there is a chance that the thresholding window, when landing on portions of an image that include the finder pattern, will cover all darkened modules. As also described herein, this can lead to damage to the finder pattern during OCR thresholding wherein portions of the finder pattern are treated as background (white). The data regions of two dimensional barcodes include error correction code, and therefore a moderate amount of damage to those modules may be tolerated. That is not, however, the case with the finder pattern, which includes no error correction mechanism. Such damage to the finder pattern may hinder the ability to recognize the two dimensional barcode, which, for obvious reasons, is undesirable.

Figure 10:
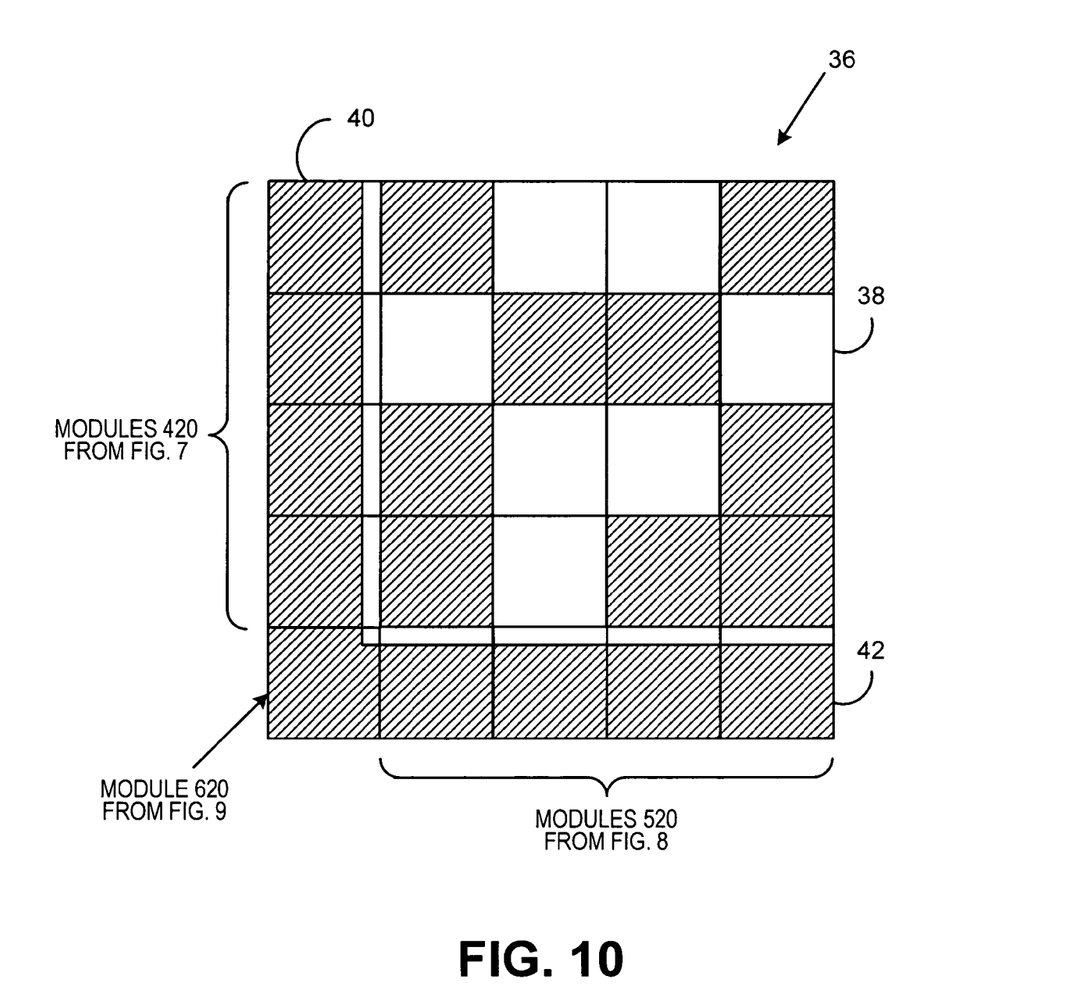
FIG. 10 is an embodiment of a two dimensional barcode including a finder pattern printed according to a method of an embodiment of the present invention.

FIG. 10 is a schematic diagram of a portion of a two dimensional barcode 36 printed by a method according to a further aspect of the present invention which helps to prevent damage to the finder pattern of the barcode during OCR thresholding. The two dimensional barcode 36 includes a data region 38 that includes a plurality of darkened and non-darkened modules. The darkened modules of the data region may have the form of any of the embodiments of modules 120, 220, 320, 420, 520 or 620 described herein, or may simply be prior art darkened modules as described in connection with FIGS. 1 and 2. The two dimensional barcode 36 also includes a finder pattern that includes a left most column 40 and a bottom row 42 of modules 20 (the finder pattern may be, for example, the "L" shaped finder pattern discussed elsewhere herein or a portion of the "+" shaped alignment pattern discussed elsewhere herein). As seen in FIG. 10, all but the last module in the left most column 40 has the form shown in FIG. 7 (right edge light), and all but the first module in the bottom row 42 has the form shown in FIG. 8 (top edge light). The last module in the left most column 40, which is also the first module in the bottom row 42, has form shown in FIG. 9 (top right corner light). As a result, as seen in FIG. 10, the inner edge of the finder pattern consists of "empty", non-printed pixel locations. This is beneficial because it will create light variation that will cause any portion thereof that is covered by the OCR thresholding window to pass the second OCR test described herein, and a result, the portion will be treated as foreground.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. In a two dimensional barcode including a plurality of darkened modules and a plurality of non-darkened modules, each of said darkened modules including a substantially rectangular array of pixel locations including (i) an outer boundary of said array including a top row of the pixel locations, a bottom row of the pixel locations, a left most column of the pixel locations, and a right most column of the pixel locations, and (ii) an inner portion of said array including the ones of said pixel locations not included within the outer boundary, a method of printing one or more of said darkened modules, comprising:

printing a pixel at a plurality of the pixel locations included in the inner portion of the array of each of the one or more of said darkened modules;

printing a pixel at at least one of the pixel locations of the bottom row of the pixel locations or the left most column of the pixel locations of the outer boundary of the array of each of the said one or more darkened modules; and printing a pixel at less than all of the pixel locations of the top row of the pixel locations and the right most column of the pixel locations of the outer boundary of the array of each of the one or more of said darkened modules.

2. The method according to claim 1, wherein printing a pixel at less than all of the pixel locations of the top row of the pixel locations and the right most column of the pixel locations of the outer boundary comprises printing a pixel at all of the pixel locations of the top row other than a first pixel location in the top row and printing a pixel at all of the pixel locations of the right most column, and wherein printing a pixel at at least one of the pixel locations of the bottom row of the pixel locations or the left most column of the pixel locations of the outer boundary further comprises printing a pixel at all of the pixel locations of the bottom row and printing a pixel at all of the pixel locations of the left most column other than a top pixel location in the left most column.

3. The method according to claim 2, wherein printing a pixel at less than all of the pixel locations of the right most column of the pixel locations of the outer boundary further comprises printing a pixel at all of the pixel locations of the right most column other than a bottom pixel location in the right most column, and wherein printing a pixel at at least one of the pixel locations of the bottom row of the pixel locations or the left most column of the pixel locations of the outer boundary further comprises printing a pixel at all of the pixel locations of the bottom row other than a last pixel location in the bottom row and printing a pixel at all of the pixel locations of the left most column other than a top pixel location in the left most column.

4. The method according to claim 2, wherein printing a pixel at less than all of the pixel locations of the right most column of the pixel locations of the outer boundary further comprises printing a pixel at all of the pixel locations of the right most column other than a bottom pixel location in the right most column, and wherein printing a pixel at at least one of the pixel locations of the bottom row of the pixel locations or the left most column of the pixel locations of the outer boundary further comprises printing a pixel at all of the pixel locations of the bottom row other than a first pixel location and a last pixel location in the bottom row and printing a pixel at all of the pixel locations of the left most column other than a top pixel location and a bottom pixel location in the left most column.

5. The method according to claim 1, wherein printing a pixel at less than all of the pixel locations of the top row of the pixel locations and the right most column of the pixel locations of the outer boundary further comprises printing a pixel at all of the pixel locations of the top row other than a first pixel location and a last pixel location in the top row and printing a pixel at all of the pixel locations of the right most column other than a top pixel location and a bottom pixel location in the right most column, and wherein printing a pixel at at least one of the pixel locations of the bottom row of the pixel locations or the left most column of the pixel locations of the outer boundary further comprises printing a pixel at all of the pixel locations of the bottom row other than a first pixel location and a last pixel location in the bottom row and printing a pixel at all of the pixel locations of the left most column other than a top pixel location and a bottom pixel location in the left most column.

6. The method according to claim 1, wherein printing a pixel at less than all of the pixel locations of the top row of the pixel locations and the right most column of the pixel locations of the outer boundary comprises printing a pixel at all of the pixel locations of the top row other than a last pixel location in the top row and printing a pixel at all of the pixel locations of the right most column other than a top pixel location in the right most column, and wherein printing a pixel at at least one of the pixel locations of the bottom row of the pixel locations or the left most column of the pixel locations of the outer boundary further comprises printing a pixel at all of the pixel locations of the bottom row and printing a pixel at all of the pixel locations of the left most column.

7. The method according to claim 1, wherein printing a pixel at less than all of the pixel locations of the top row of the pixel locations and the right most column of the pixel locations of the outer boundary comprises printing a pixel at all of the pixel locations of the top row other than a last pixel location in the top row and printing a pixel at all of the pixel locations of the right most column other than a top pixel location in the right most column, and wherein printing a pixel at at least one of the pixel locations of the bottom row of the pixel locations or the left most column of the pixel locations of the outer boundary further comprises printing a pixel at all of the pixel locations of the bottom row other than a first pixel location in the bottom row and printing a pixel at all of the pixel locations of the left most column other than a bottom pixel location in the left most column.

8. The method according to claim 1, wherein printing a pixel at less than all of the pixel locations of the top row of the pixel locations and the right most column of the pixel locations of the outer boundary comprises printing a pixel at all of the pixel locations of the top row other than a last pixel location in the top row and printing a pixel at all of the pixel locations of the right most column other than a top pixel location and a bottom pixel location in the right most column, and wherein printing a pixel at at least one of the pixel locations of the bottom row of the pixel locations or the left most column of the pixel locations of the outer boundary further comprises printing a pixel at all of the pixel locations of the bottom row other than a first pixel location and a last pixel location in the bottom row and printing a pixel at all of the pixel locations of the left most column other than a bottom pixel location in the left most column.

9. The method according to claim 1, wherein printing a pixel at less than all of the pixel locations of the top row of the pixel locations and the right most column of the pixel locations of the outer boundary comprises printing a pixel at all of the pixel locations of the top row and printing a pixel at all of the pixel locations of the right most column other than a bottom pixel location in the right most column, and wherein printing a pixel at at least one of the pixel locations of the bottom row of the pixel locations or the left most column of the pixel locations of the outer boundary further comprises printing a pixel at all of the pixel locations of the bottom row other than a last pixel location in the bottom row and printing a pixel at all of the pixel locations of the left most column.

10. The method according to claim 1, wherein printing a pixel at less than all of the pixel locations of the top row of the pixel locations and the right most column of the pixel locations of the outer boundary comprises printing a pixel at all of the pixel locations of the top row other than a first pixel location and a last pixel location of the top row and printing a pixel at all of the pixel locations of the right most column other than a top pixel location and a bottom pixel location in the right most column, and wherein printing a pixel at at least one of the pixel locations of the bottom row of the pixel locations or the left most column of the pixel locations of the outer boundary further comprises printing a pixel at all of the pixel locations of the bottom row other than a last pixel location in the bottom row and printing a pixel at all of the pixel locations of the left most column other than a top pixel location in the left most column.

11. The method according to claim 1, wherein printing a pixel at less than all of the pixel locations of the top row of the pixel locations and the right most column of the pixel locations of the outer boundary comprises printing a pixel at all of the pixel locations of the top row other than a first pixel location in the top row and printing a pixel at all of the pixel locations of the right most column, and wherein printing a pixel at at least one of the pixel locations of the bottom row of the pixel locations or the left most column of the pixel locations of the outer boundary further comprises printing a pixel at all of the pixel locations of the bottom row other than a first pixel location in the bottom row andnot printing a pixel in any of the pixel locations of the left most column.

12. The method according to claim 1, wherein printing a pixel at less than all of the pixel locations of the top row of the pixel locations and the right most column of the pixel locations of the outer boundary comprises printing a pixel at all of the pixel locations of the top row and printing a pixel at all of the pixel locations of the right most column other than a bottom pixel location in the right most column, and wherein printing a pixel at at least one of the pixel locations of the bottom row of the pixel locations or the left most column of the pixel locations of the outer boundary further comprises printing a pixel at all of the pixel locations of the left most column other than a bottom pixel location in the left most column and not printing a pixel in any of the pixel locations of the bottom row.

13. The method according to claim 1, wherein printing a pixel at less than all of the pixel locations of the top row of the pixel locations and the right most column of the pixel locations of the outer boundary comprises printing a pixel at all of the pixel locations of the top row other than a last pixel location in the top row and not printing a pixel in any of the pixel locations of the right most column, and wherein printing a pixel at at least one of the pixel locations of the bottom row of the pixel locations or the left most column of the pixel locations of the outer boundary further comprises printing a pixel at all of the pixel locations of the bottom row other than a last pixel location in the bottom row and printing a pixel at all of the pixel locations of the left most column.

14. The method according to claim 1, wherein printing a pixel at less than all of the pixel locations of the top row of the pixel locations and the right most column of the pixel locations of the outer boundary comprises printing a pixel at all of the pixel locations of the right most column other than a top pixel location in the right most column and not printing a pixel in any of the pixel locations of the top row, and wherein printing a pixel at at least one of the pixel locations of the bottom row of the pixel locations or the left most column of the pixel locations of the outer boundary further comprises printing a pixel at all of the pixel locations of the bottom row and printing a pixel at all of the pixel locations of the left most column other than a top pixel location in the left most column.

15. In a two dimensional barcode including a plurality of darkened modules and a plurality of non-darkened modules, each of said darkened modules including a substantially rectangular array of pixel locations including (i) an outer boundary of said array including a top row of the pixel locations, a bottom row of the pixel locations, a left most column of the pixel locations, and a right most column of the pixel locations, and (ii) an inner portion of said array including the ones of said pixel locations not included within the outer boundary, a method of printing one or more of said darkened modules, comprising:

printing a pixel at a plurality of the pixel locations included in the inner portion of the array of each of the one or more of said darkened modules;

printing a pixel at all of the pixel locations of the top row and printing a pixel at all of the pixel locations of the right most column, and printing a pixel at all of the pixel locations of the bottom row other than a first pixel location in the bottom row and printing a pixel at all of the pixel locations of the left most column other than a bottom pixel location in the left most column.

16. A method of printing a two dimensional barcode having a finder pattern having a substantially vertically oriented set of first darkened modules and a substantially horizontally oriented set of second darkened modules, each of said first and second darkened modules including a substantially rectangular array of pixel locations including (i) an outer boundary of said array including a top row of the pixel locations, a bottom row of the pixel locations, a left most column of the pixel locations, and a right most column of the pixel locations, and (ii) an inner portion of said array including the ones of said pixel locations not included within the outer boundary, the method comprising:

printing each of the first darkened modules by, for each said first darkened module: (a) printing a pixel at a plurality of the pixel locations included in the inner portion of the array, (b) printing a pixel at (i) all of the pixel locations of the top row other than a last pixel location in the top row, (ii) all of the pixel locations of the bottom row other than a last pixel location in the bottom row, and (iii) all of the pixel locations of the left most column, and (c) not printing a pixel in any of the pixel locations of the right most column; and printing each of the second darkened modules by, for each said second darkened module: (a) printing a pixel at a plurality of the pixel locations included in the inner portion of the array of the second darkened module, (b) printing a pixel at (i) all of the pixel locations of the bottom row, (ii) all of the pixel locations of the right most column other than a top pixel location in the right most column, and (iii) all of the pixel locations of the left most column other than a top pixel location in the left most column, and (c) not printing a pixel in any of the pixel locations of the top row.

17. The method according to claim 16, wherein the finder pattern includes an additional darkened module located at an intersection of said first set of darkened modules and said second set of darkened modules, said additional darkened module including a substantially rectangular array of pixel locations including (i) an outer boundary of said array including a top row of the pixel locations, a bottom row of the pixel locations, a left most column of the pixel locations, and a right most column of the pixel locations, and (ii) an inner portion of said array including the ones of said pixel locations not included within the outer boundary, the method further comprising:

printing said additional darkened module by printing a pixel of the additional darkened module at (i) all of the pixel locations of the top row other than a last pixel location in the top row, (ii) all of the pixel locations of the right most column other than a top pixel location in the right most column, (iii) all of the pixel locations of the bottom row, and (iv) all of the pixel locations of the left most column.

18. The method according to claim 16, wherein printing a pixel at a plurality of the pixel locations included in the inner portion of the array of the first darkened module comprises printing a pixel at all of the pixel locations included in the inner portion of the array of the first darkened module, and wherein printing a pixel at a plurality of the pixel locations included in the inner portion of the array of the second darkened module comprises printing a pixel at all of the pixel locations included in the inner portion of the array of the second darkened module.

* * * * *